(12) United States Patent
Yang et al.

(10) Patent No.: US 7,996,601 B2
(45) Date of Patent: Aug. 9, 2011

(54) APPARATUS AND METHOD OF PARTIALLY ACCESSING DYNAMIC RANDOM ACCESS MEMORY

(75) Inventors: Sang-jun Yang, Seoul (KR); Jong-chul Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 519 days.

(21) Appl. No.: 11/783,516

(22) Filed: Apr. 10, 2007

(65) Prior Publication Data

US 2008/0126691 A1  May 29, 2008

(30) Foreign Application Priority Data

Nov. 27, 2006 (KR) .................. 10-2006-0117910

(51) Int. Cl.
*G06F 12/00* (2006.01)
(52) U.S. Cl. ......... 711/105; 711/154; 711/157; 711/200
(58) Field of Classification Search .................. 711/157, 711/200, 105, 154
See application file for complete search history.

(56) References Cited

U.S. PATENT DOCUMENTS

| 5,765,182 | A | * | 6/1998 | Lau et al. | 711/5 |
| 5,987,574 | A | * | 11/1999 | Paluch | 711/158 |
| 6,000,019 | A | * | 12/1999 | Dykstal et al. | 711/157 |
| 6,026,466 | A | * | 2/2000 | Su et al. | 711/105 |
| 6,138,214 | A | * | 10/2000 | Pfefferl | 711/137 |
| 6,625,685 | B1 | * | 9/2003 | Cho et al. | 711/5 |
| 6,675,270 | B2 | * | 1/2004 | Arimilli et al. | 711/155 |
| 6,791,557 | B2 | * | 9/2004 | Champion | 345/545 |
| 7,296,112 | B1 | * | 11/2007 | Yarlagadda et al. | 711/105 |
| 7,463,267 | B2 | * | 12/2008 | Wise et al. | 345/540 |
| 2006/0236072 | A1 | * | 10/2006 | Lyon | 711/206 |
| 2008/0100635 | A1 | * | 5/2008 | Wise et al. | 345/536 |

FOREIGN PATENT DOCUMENTS

KR 1993-0004901 B1 6/1993
KR 10-2003-0091498 A 12/2003
* cited by examiner

*Primary Examiner* — Jasmine Song
(74) *Attorney, Agent, or Firm* — Sughrue Mion, PLLC

(57) ABSTRACT

Provided are an apparatus and method for partially accessing a DRAM. The apparatus for partially accessing a DRAM includes a memory controller. The memory controller includes a first sub-controller which controls a first DRAM and a second sub-controller which controls a second DRAM. Accordingly, a garbage cycle, i.e., an operation which wastes data transfer bandwidth, that may generate when a related art DRAM accessing apparatus is used, is removed.

27 Claims, 7 Drawing Sheets

(64-BIT)

APPARATUS AND METHOD OF PARTIALLY ACCESSING DYNAMIC RANDOM ACCESS MEMORY

CROSS-REFERENCE TO RELATED PATENT APPLICATION

This application claims priority from Korean Patent Application No. 10-2006-0117910, filed on Nov. 27, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to partially accessing a dynamic random access memory (DRAM), and more particularly, to partially accessing a DRAM to efficiently perform a memory access processing.

2. Description of the Related Art

DRAMs are widely used as main memories of digital systems. Particularly, as demands for a large system bandwidth for processing various functions continuously increase, the operating frequencies of DRAMs also gradually increase.

Generally, if the operating frequencies of DRAMs increase, the demands for a large system bandwidth are satisfied. However, the operating frequencies of a large number of master modules connected to a system bus must also increase in order to raise a data transfer rate by increasing the operating frequency of a memory, and thus it is very difficult or impossible to design the system.

While high-speed memories such as DDR2 SDRAM, DDR3 SDRAM and Rambus DRAM have recently been developed and form the basis for increasing system performance, the operating frequency of a system bus has to be increased in order to use a memory having a higher clock frequency. This may result in excessive overhead for a chip size, high power consumption and an increase in the manufacturing cost.

FIG. 1 is a block diagram of a related art apparatus for accessing a DRAM. Referring to FIG. 1, the related art DRAM accessing apparatus includes a memory controller 102. The memory controller 102 includes a single memory interface 103 and is connected to first and second DRAMs 104 and 105 through the memory interface 103. The memory interface 103 transmits the same control signal of the memory controller 102 to first and second DRAMs 104 and 105.

The first and second DRAMs 104 and 105 are connected in parallel with each other through the single memory interface 103 of the single memory controller 102. Thus, the first and second DRAMs 104 and 105 share the control signal transmitted from the memory controller 102 and respectively write and read data.

FIG. 2 is a timing diagram illustrating the generation of a garbage cycle, which is a cycle that wastes a data transfer bandwidth, when data is read at a double data rate (DDR) in the related art DRAM accessing apparatus illustrated in FIG. 1. Referring to FIG. 2, it is assumed that the length of requested data is smaller than the burst length of the DRAMs 104 and 105 (Refer B data in FIG. 2). Data requested to be read through a system bus 101 includes data B0, B1, B2 and B3 each having 16 bits. The data B0, B1, B2 and B3 read from the DRAMs 104 and 105 is rearranged as 64-bit data B(3210) in the memory controller 102 and output to the system bus 101.

The memory controller 102 reads data DQ of the DRAMs 104 and 105 in response to a single control signal, and thus the data DQ should be read in the order of DQ1 (B0), DQ2 (B1), DQ1 (B2) and DQ2 (B3). Accordingly, unnecessary data B4, B5, B6 and B7 corresponding to the burst length of the DRAMs 104 and 105 have to be read.

As described above, the related art DRAM accessing apparatus generates a garbage cycle that wastes a data transfer bandwidth when the length of data requested to be read from the DRAMs 104 and 105 is shorter than the burst length of the DRAMs 104 and 105 because the DRAMs 104 and 105 are controlled in response to a single control signal.

Furthermore, when a request from a video CODEC is processed, data is processed for each block of a frame. In this process, a request to read data having a length less than the burst length of a DRAM is frequently generated. Accordingly, a solution for reducing waste of the data transfer bandwidth when data is requested is desired.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for partially accessing a DRAM for reducing a garbage cycle when the DRAM is requested to be accessed to efficiently perform a memory access processing and obtain a higher data transfer rate with the same cost and effect as for manufacturing the related art memory accessing apparatus.

According to an aspect of the present invention, there is provided an apparatus of partially accessing a DRAM comprising a memory controller which controls the DRAM. The memory controller comprises a first sub-controller which controls a first DRAM and a second sub-controller which controls a second DRAM.

The first sub-controller may access a lower address region having lower n bits of $0\times0$ through $0\times(2^{(n-1)}-1)$ of an address region requested to be accessed in the first DRAM having a $2^n$-bit data width.

The first sub-controller may allocate continuous first data units having a length smaller than or identical to the burst length of the first DRAM to the first DRAM.

The second sub-controller may access an upper address region having lower n bits of $0\times2^{(n-1)}$ through $0\times(2^n-1)$ of an address region requested to be accessed in the second DRAM having a $2^n$-bit data width.

The second sub-controller may allocate continuous second data units having a length smaller than or identical to the burst length of the second DRAM to the second DRAM. The second data units follow the first data units and do not overlap with the first data units.

The memory controller may comprise a write data queue buffering data received from a system bus and writing the data to the first and second DRAMs through the sub-controllers.

The memory controller may comprise a read data queue buffering data read from the first and second DRAMs and outputting the data to the system bus.

The memory controller may comprise a transaction queue determining which one of the first and second DRAMs will be accessed.

The transaction queue may compare the lower nth bit of the address region requested to be accessed with a stride bit and determine a DRAM that will be accessed, where n is 4 or 5.

When video data is input, the transaction queue may allocate start data of a first line of the video data to the first DRAM and allocate start data of a second line of the video data to the second DRAM.

The first and second DRAMs may be selected from the group consisting of SDR SDRAM, DDR SDRAM, DDR2 SDRAM, DDR3 SDRAM and Rambus DRAM.

The apparatus for partially accessing a DRAM removes a garbage cycle generated in the first and second DRAMs.

The apparatus for partially accessing a DRAM may be included in a memory scheduler or located outside the memory scheduler.

According to another aspect of the present invention, there is provided an apparatus for partially accessing a DRAM comprising a memory controller which controls the DRAM. The memory controller comprises a plurality of sub-controllers respectively which controls a plurality of DRAMs.

The plurality of sub-controllers may access address regions, which are not overlapped, in the plurality of DRAMs.

Each of the plurality of sub-controllers may allocate continuous data having a length smaller than or identical to the burst length of each of the plurality of DRAMs to each of the plurality of DRAMs.

According to another aspect of the present invention, there is provided a method for partially accessing a DRAM comprising: receiving a request to access a DRAM from a system bus; accessing a first DRAM having a $2^n$-bit data width when lower n bits of an address region requested to be accessed are $0\times0$ through $0\times(2^{(n-1)}-1)$; and accessing a second DRAM having a $2^n$-bit data width when lower n bits of the address region requested to be accessed are $0\times2^{(n-1)}$) through $0\times(2^n-1)$.

A first sub-controller may allocate continuous first data units having a length smaller than or identical to the burst length of the first DRAM to the first DRAM.

A second sub-controller may allocate continuous second data units having a length smaller than or identical to the burst length of the second DRAM to the second DRAM. The second data units follow the first data units and do not overlap with the first data units.

The method may further comprise after the receiving of the access request determining whether the access request is transmitted from a CODEC, and when the access request is transmitted from the CODEC, accessing the first DRAM when a stride bit is 0 and lower n bit of an address region requested to be accessed are $0\times0$ through $0\times(2^{(n-1)}-1)$ or the stride bit is 1 and the lower n bits of the address region are $0\times2^{(n-1)}$through $0\times(2^n-1)$.

The method may further comprise accessing the second DRAM when the stride bit is 1 and the lower n bit of the address region are $0\times0$ through $0\times(2^{(n-1)}-1)$ or the stride bit is 0 and the lower n bits of the address region are $0\times2^{(n-1)}$ through $0\times(2^n-1)$ when the access request is transmitted from the CODEC.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
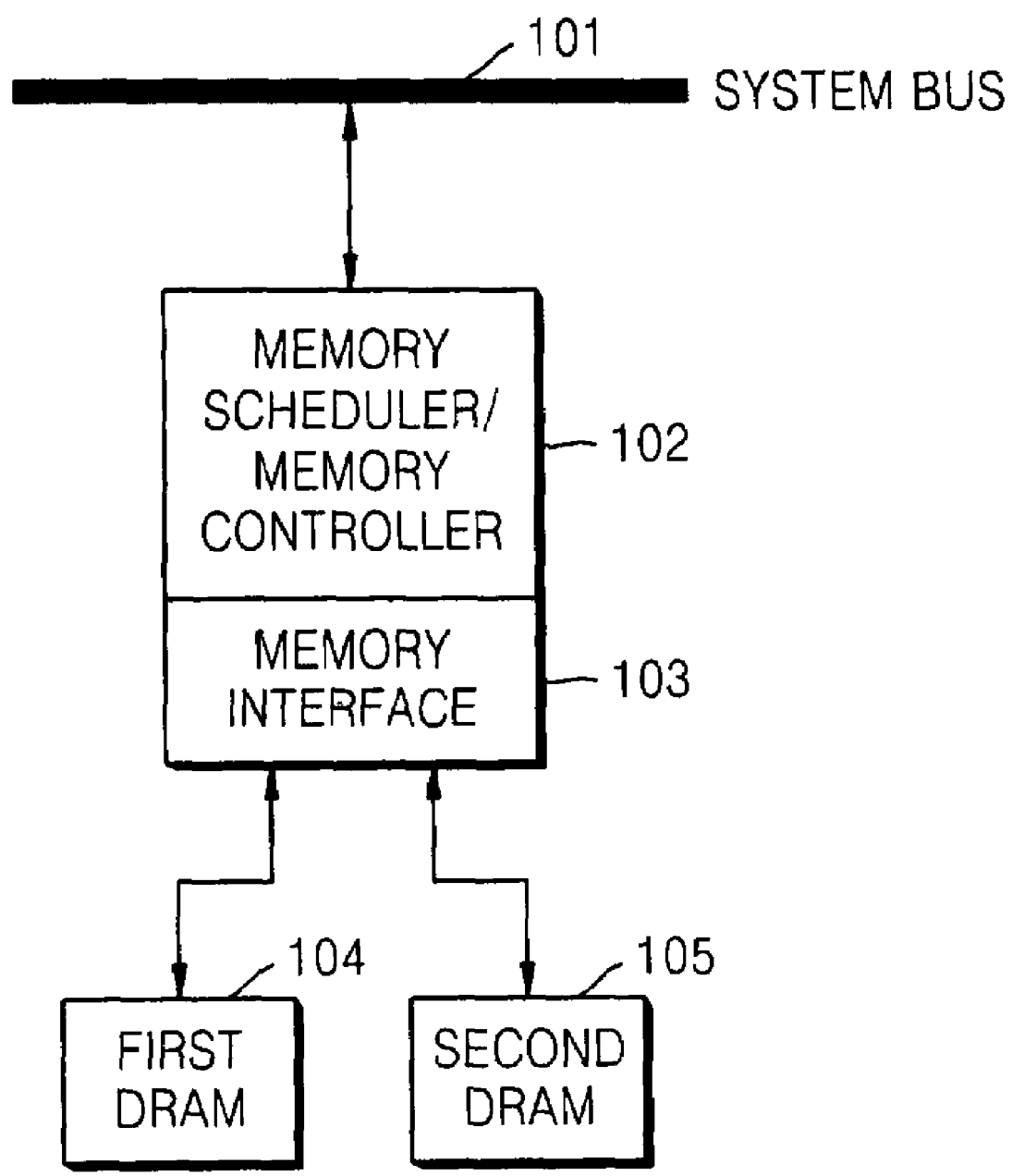
FIG. 1 is a block diagram of a related art apparatus for accessing a DRAM.
Figure 2:
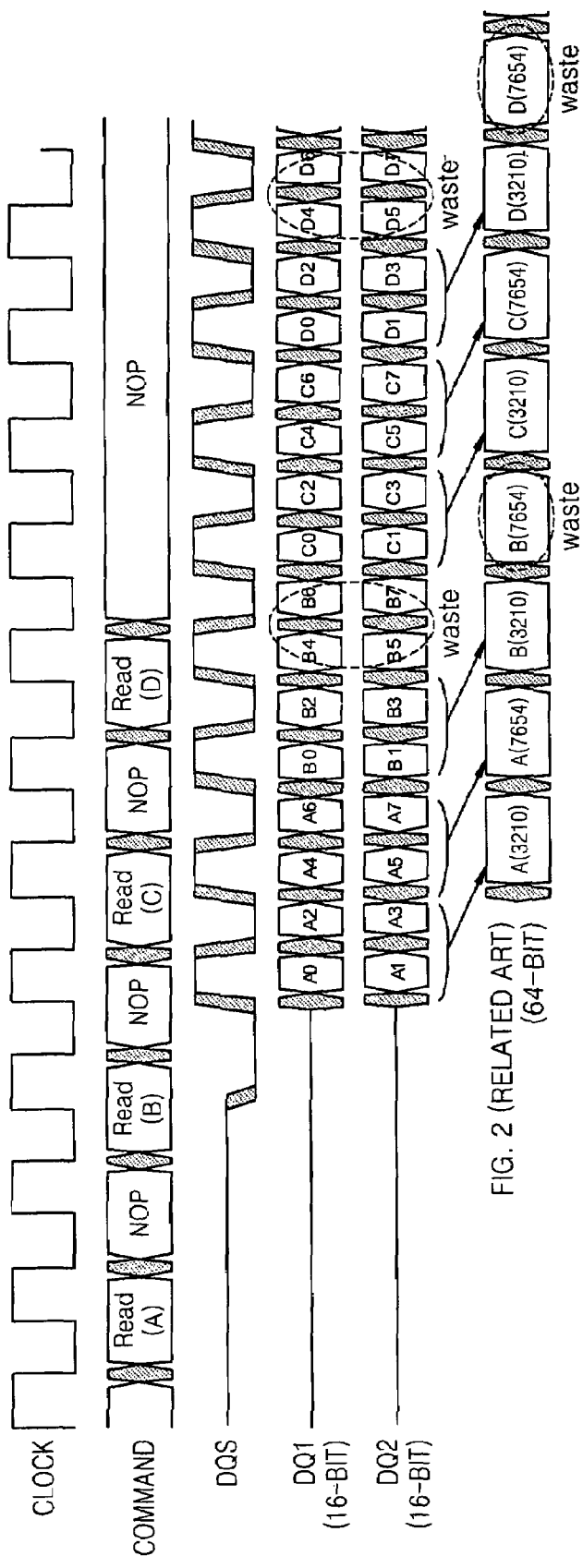
FIG. 2 is a timing diagram illustrating the generation of a garbage cycle when data is read at a DDR in the related art apparatus for accessing a DRAM illustrated in FIG. 1.

The present invention will now be described more fully with reference to the accompanying drawings, in which exemplary embodiments of the invention are shown. The invention may, however, be embodied in many different forms and should not be construed as being limited to the exemplary embodiments set forth herein; rather, these embodiments are provided so that this disclosure will be thorough and complete, and will fully convey the concept of the invention to those skilled in the art. Throughout the drawings, like reference numerals refer to like elements.

Figure 3:
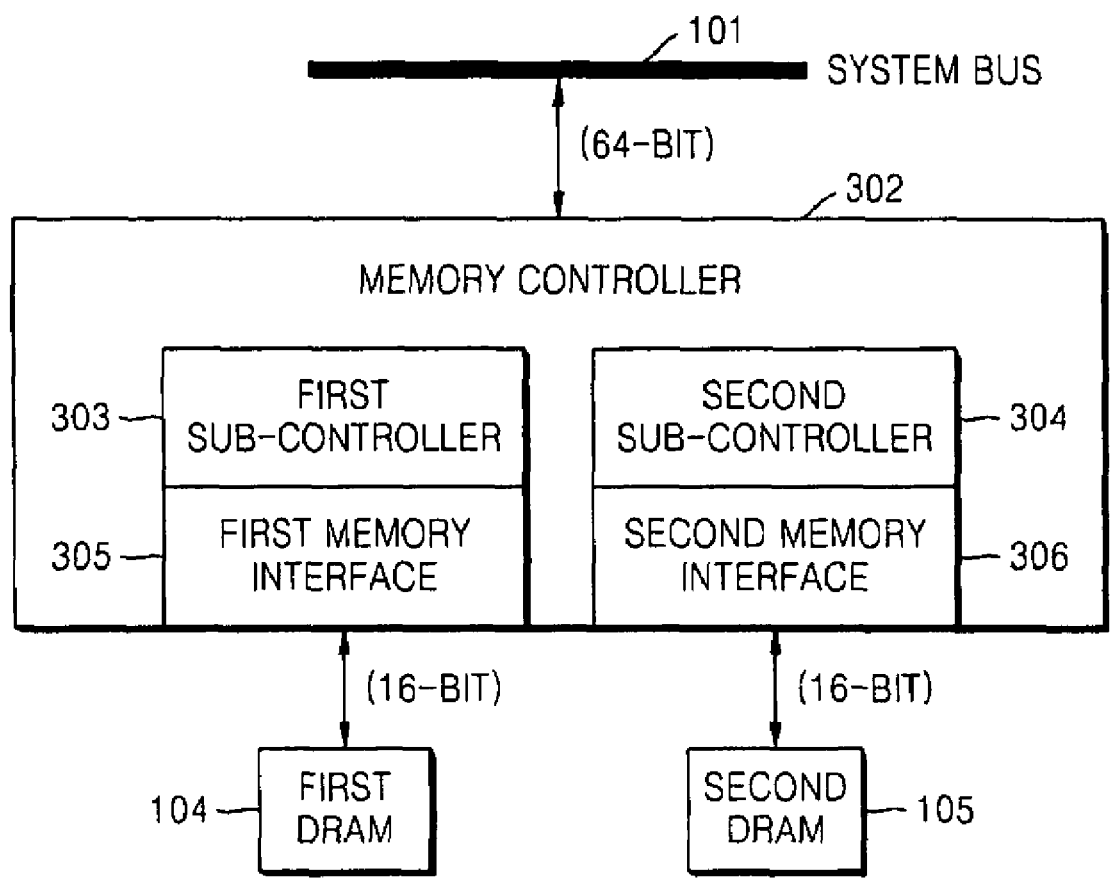
FIG. 3 is a block diagram of an apparatus for partially accessing a DRAM according to an exemplary embodiment of the present invention.

FIG. 3 is a block diagram of an apparatus for partially accessing a DRAM according to an exemplary embodiment of the present invention. Referring to FIG. 3, the apparatus for partially accessing a DRAM includes a memory controller 302. A first DRAM 104 and a second DRAM 105 illustrated in FIG. 3 correspond to the first DRAM 104 and the second DRAM 105 illustrated in FIG. 1.

The memory controller 302 includes a first sub-controller 303 which controls the first DRAM 104 and a second sub-controller 304 which controls the second DRAM 105. While the memory controller 302 includes the two sub-controllers 303 and 304 in the present exemplary embodiment, the number of sub-controllers is not limited to two and the memory controller 302 can include more than two sub-controllers.

The memory controller 302 controls the first sub-controller 303 and the second sub-controller 304 to respective receive different control signals. For example, when 32-bit data is transmitted from the memory controller 302 to the first DRAM 104 and the second DRAM 105, the 32-bit data is divided into upper 16-bit data and lower 16-bit data, the lower 16-bit data is transmitted to the first DRAM 104 through the first sub-controller 303, and the upper 16-bit data is transmitted to the second DRAM 105 through the second sub-controller 304.

The memory controller 302 can be included in a memory scheduler (not shown) or located outside the memory scheduler. The configuration and operation of the memory controller 302 will be explained in more detail with reference to FIG. 4.

The first sub-controller 303 includes a first memory interface 305 for accessing the first DRAM 104. The first sub-controller 303 is located inside the memory controller 302 and controls access to the first DRAM 104. The first sub-controller 303 and the second sub-controller 304 respectively include different memory interfaces and do not share a control signal.

The second sub-controller 304 includes a second memory interface 306 for accessing the second DRAM 105. The second sub-controller 304 controls access to the second DRAM 105. The operation of the second sub-controller 304 is identical to that of the first sub-controller 303 but the second sub-controller 304 uses a control signal different from the control signal used for the first sub-controller 303.

The first DRAM 104 is connected to the first sub-controller 303 through the first memory interface 305 of the memory controller 302. The first DRAM 104 receives a control signal from the memory controller 302 through the first sub-controller 303 and inputs/outputs requested data.

The second DRAM 105 receives a control signal transmitted from the second sub-controller 304 and inputs/outputs requested data. The control signal input to the first DRAM 104 is different from the control signal input to the second DRAM 105.

In the present exemplary embodiment, a 64-bit system bus 101 and two 16-bit DRAMs 104 and 105 are used. However, the number of DRAMs connected to the memory controller 302 is not limited to two and more than two DRAMs can be connected to the memory controller 302. To connect a plurality of DRAMs to the memory controller 302, the memory controller include sub-controllers as many as the DRAMs.

The DRAMs 104 and 105 may be SDR DRAM, DDR DRAM, DDR2 DRAM, DDR3 DRAM and Rambus DRAM.

Figure 4:
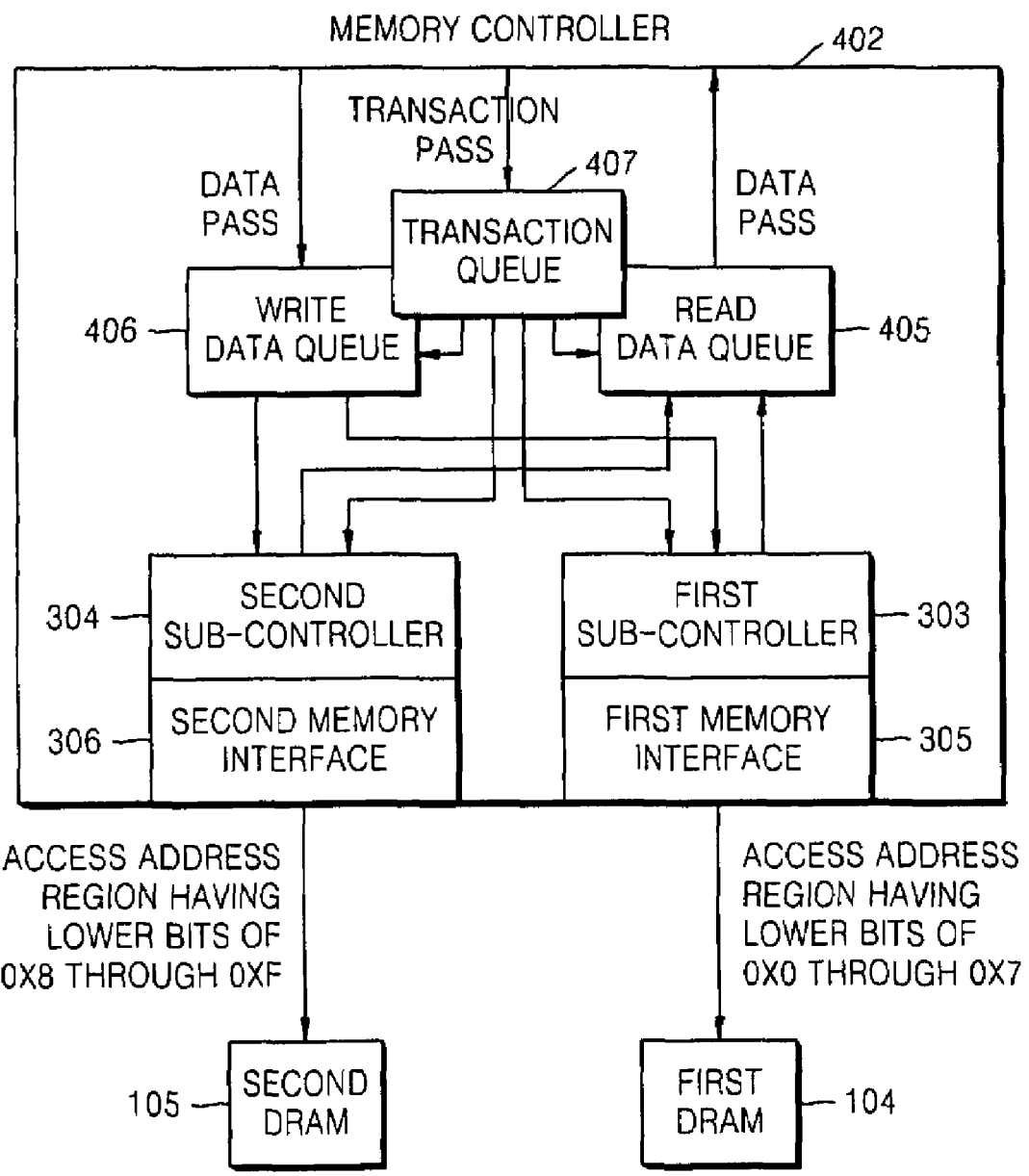
FIG. 4 is a block diagram of a memory controller of the apparatus for partially accessing a DRAM illustrated in FIG. 3 according to an exemplary embodiment of the present invention.

FIG. 4 is a block diagram of the memory controller 402 (302) of the apparatus for partially accessing a DRAM illustrated in FIG. 3 according to an exemplary embodiment of the present invention. Referring to FIG. 4, the memory controller 402 includes the first sub-controller 303, the second sub-controller 304, a read data queue 405, a write data queue 406 and a transaction queue 407.

As described above, the first sub-controller 303 includes the first memory interface 305 for accessing the first DRAM 104, and the second sub-controller 304 includes the second memory interface 306 for accessing the second DRAM 105. When the first DRAM 104 has a data width of $2^n$ bits, for example, the first sub-controller 303 accesses a lower address region having lower n bits $0\times0$ through $0\times(2^{(n-1)}-1)$ of an address region requested to be accessed in the first DRAM 104. Here, "0x" represents a hexadecimal number (for example, "0xC" represents a binary number 1100). Thus, when the first DRAM 104 has a 16-bit data width, a lower address region having lower 4 bits $0\times0$ through $0\times7$ in the first DRAM 104 is accessed. The value of n can be set, for example, to 4 or 5.

When the second DRAM 105 has a data width of $2^n$ bits, the second sub-controller 304 accesses an upper address region having lower n bits $0\times2^{(n-1)}$ through $0\times(2^{(n-1)}-1)$ of the requested address region in the second DRAM 105. The value of n can be set, for example, to 4 or 5.

The first and second DRAMs 104 and 105 are accessed under the control of the transaction queue 407. The control operation of the transaction queue 107 will be explained in detail.

The read data queue 405 buffers data read from the first and second DRAMs 104 and 105 and, when data corresponding to a data length The memory controller 402 rearranges data (for example, A0 and A1) read from the first and second DRAMs 104 and 105 as A(3210) and outputs the rearranged data A(3210) to the system bus 101.

That is, when the length of requested data is smaller than the burst length of the DRAMs, the memory controller 402 is not required to read or write unnecessary data corresponding to the burst length of the second DRAM 105, and thus a garbage cycle is reduced.

Figure 5:
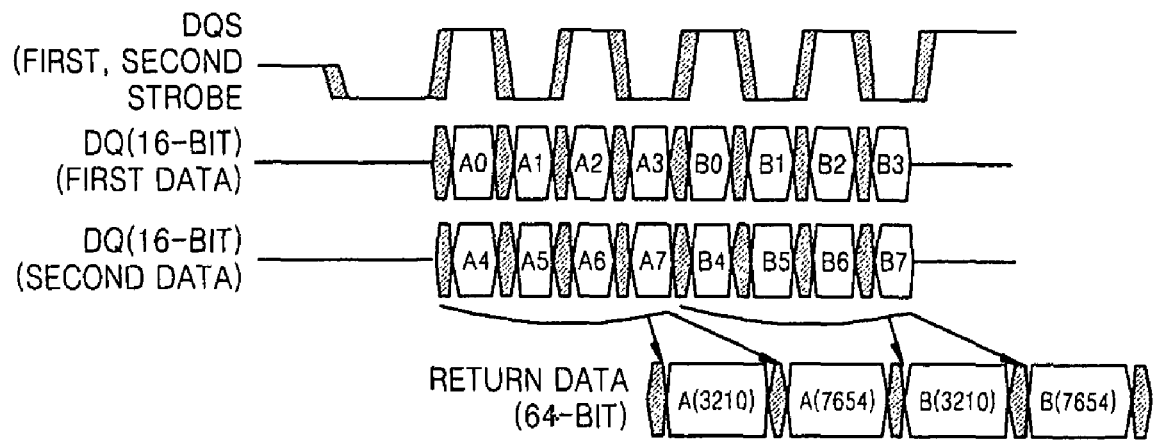
FIG. 5 is a timing diagram of an operation when the apparatus for partially accessing a DRAM is used at a DDR.

FIG. 5 is a timing diagram of an operation when the apparatus for partially accessing a DRAM according to an exemplary embodiment of the present invention is used at a DDR. Referring to FIG. 5, assume that the length of requested data is identical to the burst length of the first and second DRAMs 104 and 105 (refer to data A in FIG. 5). Data A requested to be accessed through the system bus 101 includes A0 through A7 each having 16 bits. Data A0, A1, A2 and A3 read from the first DRAM 104 and data A4, A5, A6 and A7 read from the second DRAM 105 are rearranged as A(3210) and A(7654) (that is, 64-bit data) in the memory controller 402 and output to the system bus 101.

When the memory controller 402 processes an access request from a video CODEC in a digital TV system, for example, data has to be processed as a stride having a predetermined size. The stride indicates the width of a single row of pixel data, which corresponds to the number of bytes.

Figure 8:
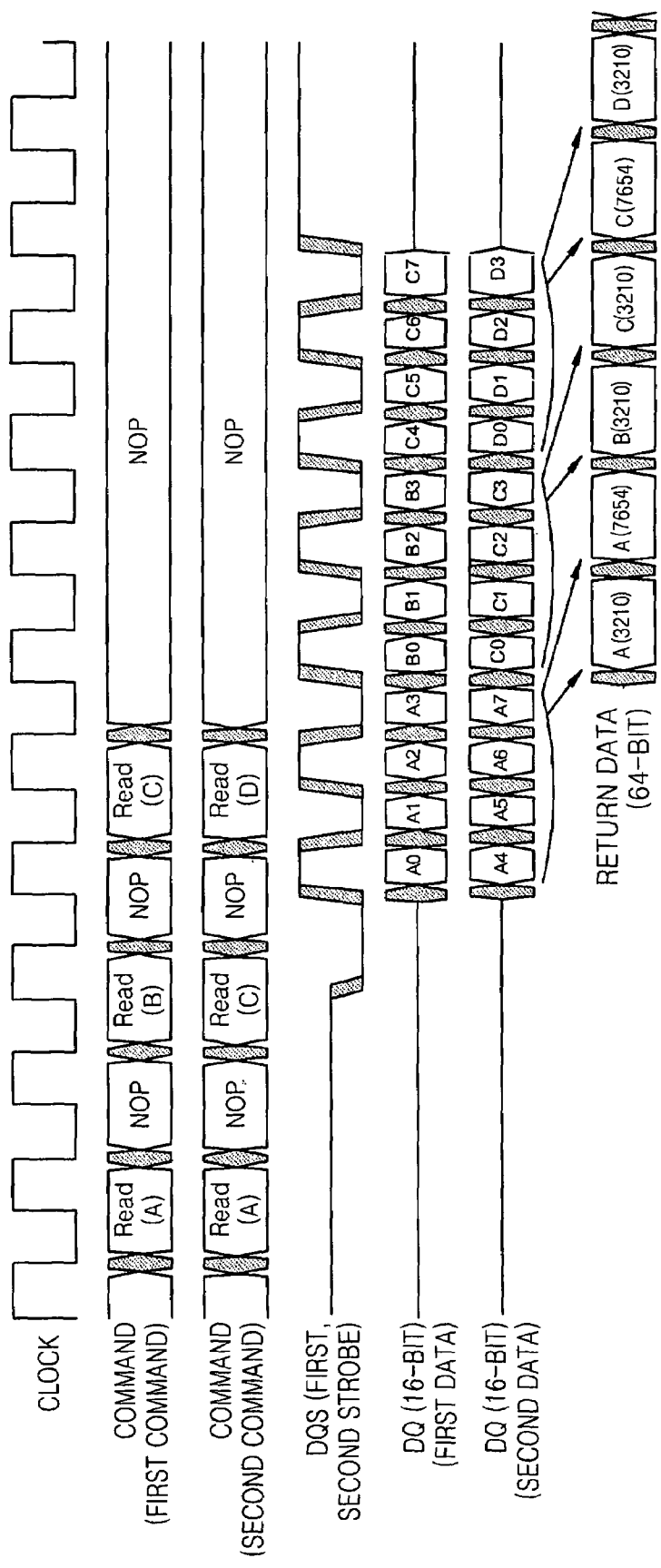
FIG. 8 is a timing diagram illustrating a reduction in a garbage cycle according to the method illustrated in FIG. 7.

In this case, when it is assumed that data requested to be accessed is B(3210) including B0, B1, B2 and B3, C(3210) and C(7654) including C1 through C7 and the burst length of the DRAM is 4, the transaction queue 407 may allocate B0, B1, B2 and B3 to the first DRAM 104, allocate C0, C1, C2 and C3 to the second DRAM 105 and allocate C4, C5, C6 and C7 to the first DRAM 104 (refer to FIG. 8).

Figure 6:
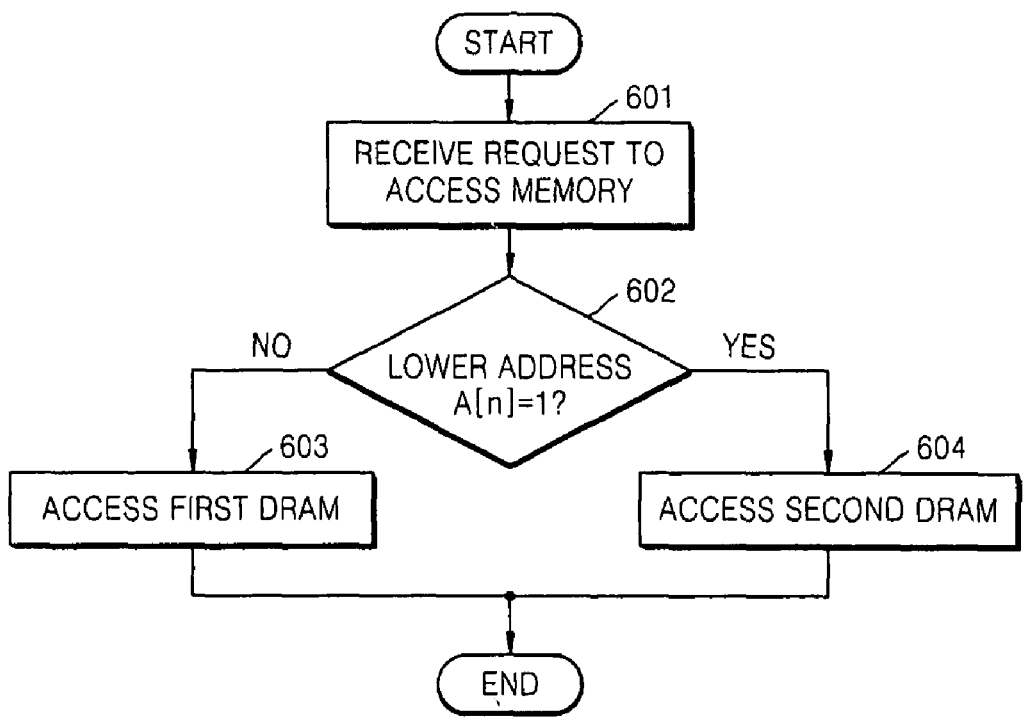
FIG. 6 is a flow chart of a method for partially accessing a DRAM according to an exemplary embodiment of the present invention.

FIG. 6 is a flow chart of a method for partially accessing a DRAM according to an exemplary embodiment of the present invention. Referring to FIG. 6, the memory controller 402 receives a request to access a DRAM from a master module through the system bus 101 in the operation 601. Then, the memory controller 402 determines whether a lower nth bit of an address region requested to be accessed is 1 in the operation 602. Here, assume that the data width of the DRAM is $2^n$.

If the lower nth bit of the address region requested to be accessed is 0, the requested address region corresponds to a lower address region having lower n bits of $0\times0$ through $0\times(2^{(n-1)}-1)$. Thus, the memory controller 402 accesses the first DRAM 104 in the operation 603.

If the lower nth bit of the requested address region is 1, the address region corresponds to an upper address region having lower n bits of $0\times2^{(n-1)}$ through $0\times(2^n-1)$. Accordingly, the memory controller 402 accesses the second DRAM 105 in the operation 604.

Figure 7:
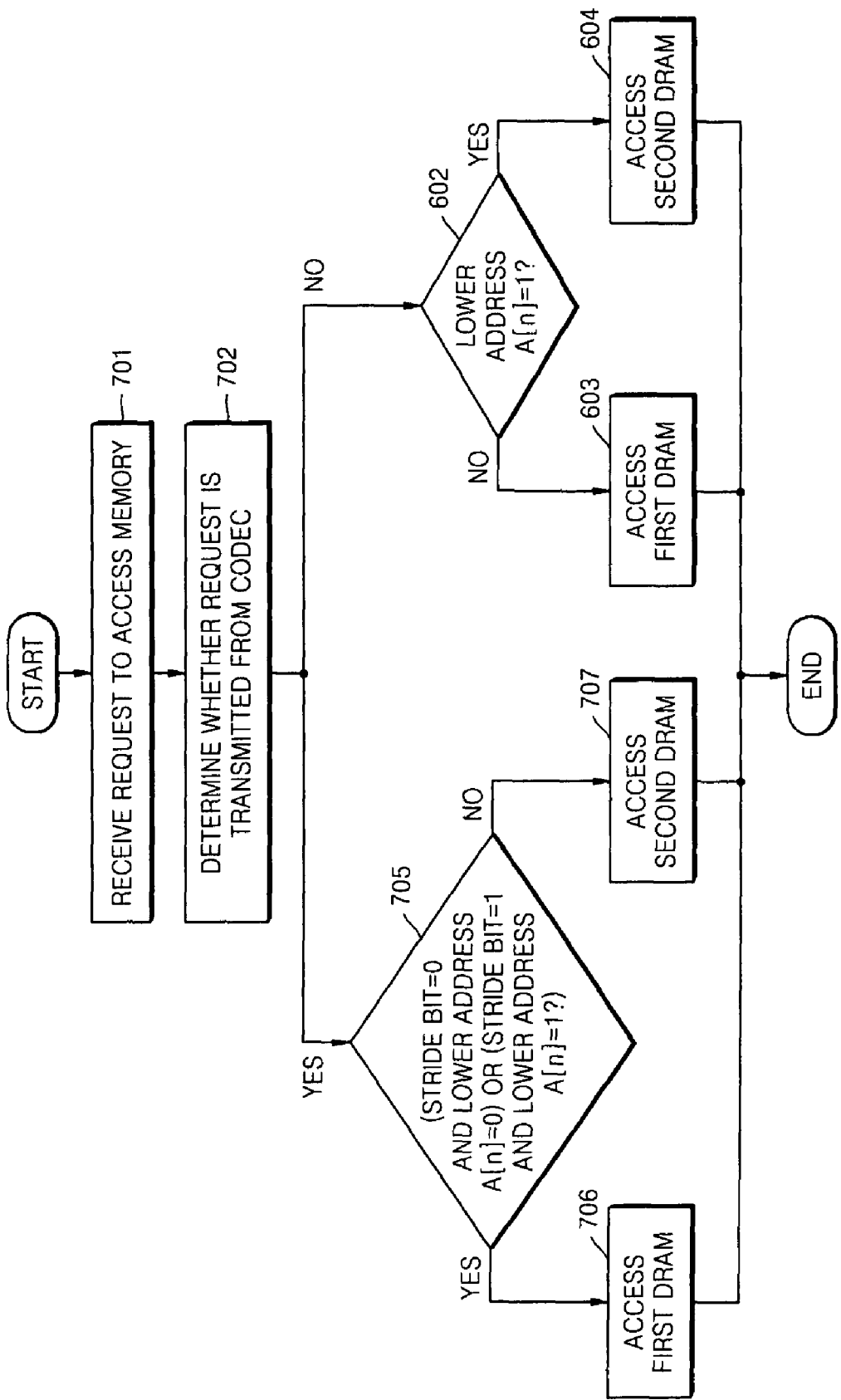
FIG. 7 is a flow chart of a method for partially accessing a DRAM when an access request is received from a video CODEC according to another exemplary embodiment of the present invention.

FIG. 7 is a flow chart of a method for partially accessing a DRAM when an access request is received from a video CODEC according to another exemplary embodiment of the present invention. Referring to FIG. 7, the memory controller 402 receives a request to access a DRAM from the master module through the system bus 101 in the operation 701. Then, the memory controller 402 determines whether the access request is received from a video CODEC in the operation 702. If the access request is not received from the video CODEC, the operations 602, 603 and 604 illustrated in FIG. 6 are executed. If the access request is received from the video CODEC, the memory controller 402 compares a stride bit to a lower nth bit of an address region requested to be accessed to access a corresponding DRAM in the operation 705.

In the case of $2^n$-bit DRAM, the memory controller 402 accesses the first DRAM 104 when the stride bit is 0 and the lower nth bit of the requested address region is 0 or the stride bit is 1 and the lower nth bit of the requested address region is 1 in the operation 706. When the stride bit is 0 and the lower nth bit of the requested address region is 1 or the stride bit is 1 and the lower nth bit of the requested address region is 0, the memory controller 402 accesses the second DRAM 105 in the operation 707.

When the stride size is 0×800, for example, the stride bit corresponds to the lower eleventh bit of the address region (that is, 1000/0000/0000), and thus the lower fourth bit of the address region is compared with the stride bit in the case of 16-bit DRAM. When the stride bit is 0 and the lower fourth bit of the address region is 0 or the stride bit is 1 and the lower fourth bit of the address region is 1, the memory controller 402 controls the first data to be read from or written to the first DRAM 104. The portion of data requested to be accessed, which exceeds the burst length of the first DRAM 104, is read from or written to the second DRAM 105. If there is still a portion of the accessed data, which exceeds the burst length of the second DRAM 105, the portion of the accessed data is read from or written to the first DRAM 104.

FIG. 8 is a timing diagram illustrating a reduction in a garbage cycle according to the method illustrated in FIG. 7. Referring to FIG. 8, data A0, A1, A2 and A3 are written to or read from the first DRAM 104 because the stride bit is 0 and the lower fourth bit of the address region is 0. Data A4, A5, A6 and A7 that exceed the burst length of the first DRAM 104 is read from or written to the second DRAM 105. Data C0, C1, C2 and C3 is read from or written to the second DRAM 105 because the stride bit is 1 and the lower fourth bit of the address region is 0. Data C4, C5, C6 and C7 that exceed the burst length of the second DRAM 105 is read from or written to the first DRAM 104.

As described above, according to the present invention, the memory controller includes sub-controllers which respectively control DRAMs to reduce a garbage cycle that may generate when the DRAMs are accessed. Furthermore, a DRAM access processing is performed more efficiently to obtain a higher data transfer rate with the same cost and effort as for manufacturing the related art DRAM accessing apparatus. Moreover, an improved DRAM accessing method is used to maximize system performance and prevent excessive overhead for a chip size, high power consumption and an increase in the manufacturing cost.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for partially accessing a DRAM comprising a memory controller which controls the DRAM, wherein:
   the memory controller comprises a first sub-controller which controls a first DRAM and a second sub-controller which controls a second DRAM;
   the first sub-controller accesses a lower address region having lower n bits of 0×0 through $0\times(2^{(n-1)}-1)$ of an address region requested to be accessed in the first DRAM having a $2^n$-bit data width; and
   in response to a length of data requested to be written or read to the first and second DRAMs being less than or equal to a burst length of the first and second DRAMs, the memory controller accesses only one of the first and second DRAMs to write or read the data via the corresponding one of the first and second sub-controller.

2. The apparatus of claim 1, wherein the first sub-controller allocates continuous first data units having a length smaller than or identical to a burst length of the first DRAM to the first DRAM.

3. The apparatus of claim 2, wherein the second sub-controller allocates continuous second data units having a length smaller than or identical to a burst length of the second DRAM to the second DRAM, and the continuous second data units follow the continuous first data units and do not overlap with the continuous first data units.

4. The apparatus of claim 1, wherein the second sub-controller accesses an upper address region having lower n bits of $0\times2^{(n-1)}$ through $0\times(2^n-1)$ of an address region requested to be accessed in the second DRAM having a $2^n$-bit data width.

5. The apparatus of claim 4, wherein n is 4 or 5.

6. The apparatus of claim 1, wherein the memory controller comprises a write data queue which buffers data received from a system bus and writes the data to the first and second DRAMs through the first and second sub-controllers.

7. The apparatus of claim 1, wherein the memory controller comprises a read data queue which buffers data read from the first and second DRAMs and outputs the data to the system bus.

8. The apparatus of claim 1, wherein the memory controller comprises a transaction queue which determines which one of the first and second DRAMs will be accessed.

9. The apparatus of claim 8, wherein the transaction queue compares the lower nth bit of the address region requested to be accessed with a stride bit and determines a DRAM that will be accessed.

10. The apparatus of claim 8, wherein, if video data is input, the transaction queue allocates start data of a first line of the video data to the first DRAM and allocates start data of a second line of the video data to the second DRAM.

11. The apparatus of claim 1, wherein n is 4 or 5.

12. The apparatus of claim 1, wherein the first and second DRAMs are selected from the group consisting of SDR SDRAM, DDR SDRAM, DDR2 SDRAM, DDR3 SDRAM and Rambus DRAM.

13. The apparatus of claim 1, wherein a garbage cycle generated in the first and second DRAMs is removed, wherein the garbage cycle comprises an operation which wastes data transfer bandwidth.

14. The apparatus of claim 1, wherein the apparatus for partially accessing a DRAM is located in a memory scheduler or located outside the memory scheduler.

15. The apparatus of claim 1, wherein each of the first sub-controller and the second sub-controller controls a single DRAM.

16. An apparatus for partially accessing a DRAM comprising a memory controller which controls the DRAM, wherein:
   the memory controller comprises a plurality of sub-controllers which respectively control a plurality of DRAMs;
   the plurality of sub-controllers access address regions, which are not overlapped, in the plurality of DRAMs; and
   each of the plurality of sub-controllers allocates continuous data having a length smaller than or identical to the burst length of each of the plurality of DRAMs to each of the plurality of DRAMs.

17. The apparatus of claim 16, wherein each of the plurality of sub-controllers controls a single DRAM.

18. A method for partially accessing a DRAM comprising:
   receiving a request to access a DRAM from a system bus;

accessing a first DRAM having a $2^n$-bit data width if lower n bits of an address region requested to be accessed are $0\times 0$ through $0\times(2^{(n-1)}-1)$; and accessing a second DRAM having a $2^n$-bit data width if the lower n bits of the address region requested to be accessed are $0\times 2^{(n-1)}$ through $0\times(2^n-1)$.

19. The method of claim 18, wherein a first sub-controller allocates continuous first data units having a length smaller than or identical to a burst length of the first DRAM to the first DRAM.

20. The method of claim 19, wherein a second sub-controller allocates continuous second data units having a length smaller than or identical to the burst length of the second DRAM to the second DRAM, and the continuous second data units follow the continuous first data units and do not overlap with the continuous first data units.

21. The method of claim 18 further comprising after the receiving of the access request:

determining whether the access request is transmitted from a CODEC; and if the access request is transmitted from the CODEC, accessing the first DRAM if a stride bit is 0 and lower n bits of an address region requested to be accessed are $0\times 0$ through $0\times(2^{(n-1)}-1)$ or the stride bit is 1 and the lower n bits of the address region are $0\times 2^{(n-1)}$ through $0\times(2^n-1)$.

22. The method of claim 21 further comprising accessing the second DRAM if the stride bit is 1 and the lower n bits of the address region are $0\times 0$ through $0\times(2^{(n-1)}-1)$ or the stride bit is 0 and the lower n bits of the address region are $0\times 2^{(n-1)}$ through $0\times(2^n-1)$, if the access request is transmitted from the CODEC.

23. The method of claim 22, wherein n is 4 or 5.

24. The method of claim 21, wherein n is 4 or 5.

25. The method of claim 18, wherein the first and second DRAMs are selected from the group consisting of SDR SDRAM, DDR SDRAM, DDR2 SDRAM, DDR3 SDRAM and Rambus DRAM.

26. The method of claim 18, wherein a garbage cycle generated in the first and second DRAMs is removed, wherein the garbage cycle comprises an operation which wastes data transfer bandwidth.

27. The method of claim 18, wherein an apparatus using the method for partially accessing a DRAM is located in a memory scheduler or located outside the memory scheduler.

* * * * *